Figure 1:
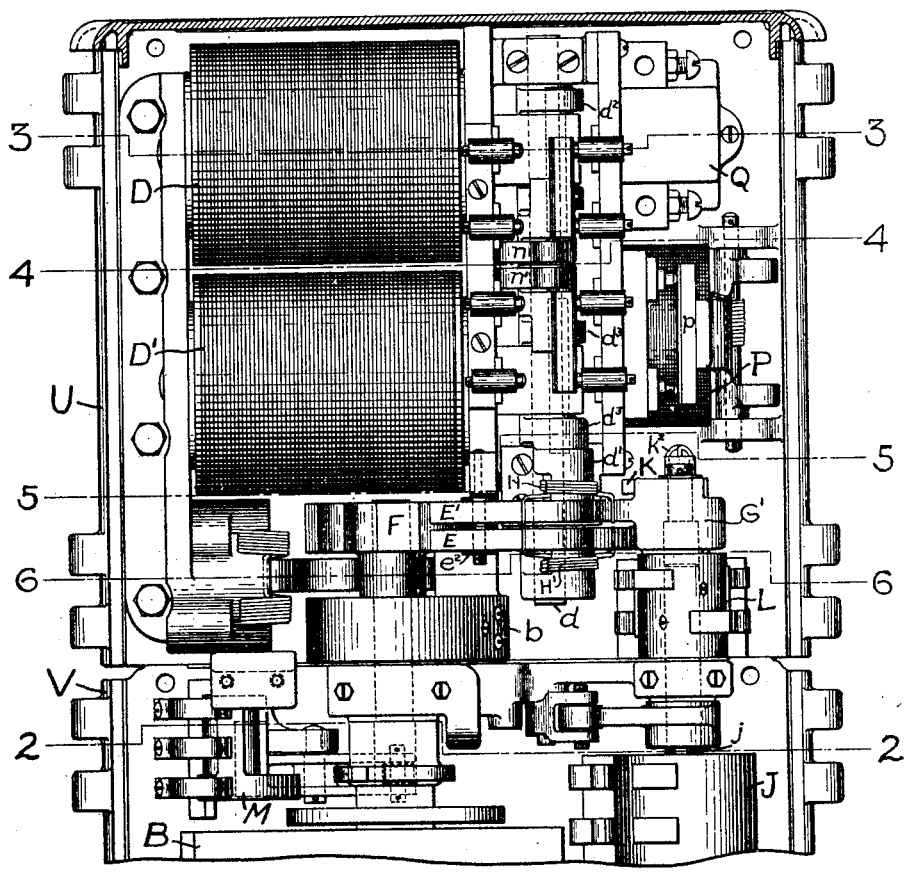

No. 806,635.   PATENTED DEC. 5, 1905.
E. R. CARICHOFF.
MOTOR CONTROL SYSTEM.
APPLICATION FILED AUG. 4, 1904.

4 SHEETS—SHEET 1.

Witnesses.

Inventor.
Eugene R. Carichoff.
by Albert G. Davis
Att'y.

No. 806,635. PATENTED DEC. 5, 1905.
E. R. CARICHOFF.
MOTOR CONTROL SYSTEM.
APPLICATION FILED AUG. 4, 1904.

4 SHEETS—SHEET 2.

Witnesses.
Jonathan E. Briggs.
Helen Oxford.

Inventor:
Eugene R. Carichoff,
by Albert B. Davis
Att'y.

No. 806,635. PATENTED DEC. 5, 1905.
E. R. CARICHOFF.
MOTOR CONTROL SYSTEM.
APPLICATION FILED AUG. 4, 1904.

4 SHEETS—SHEET 3.

Witnesses.

Inventor:
Eugene R. Carichoff.
by Albert G. Davis
Att'y.

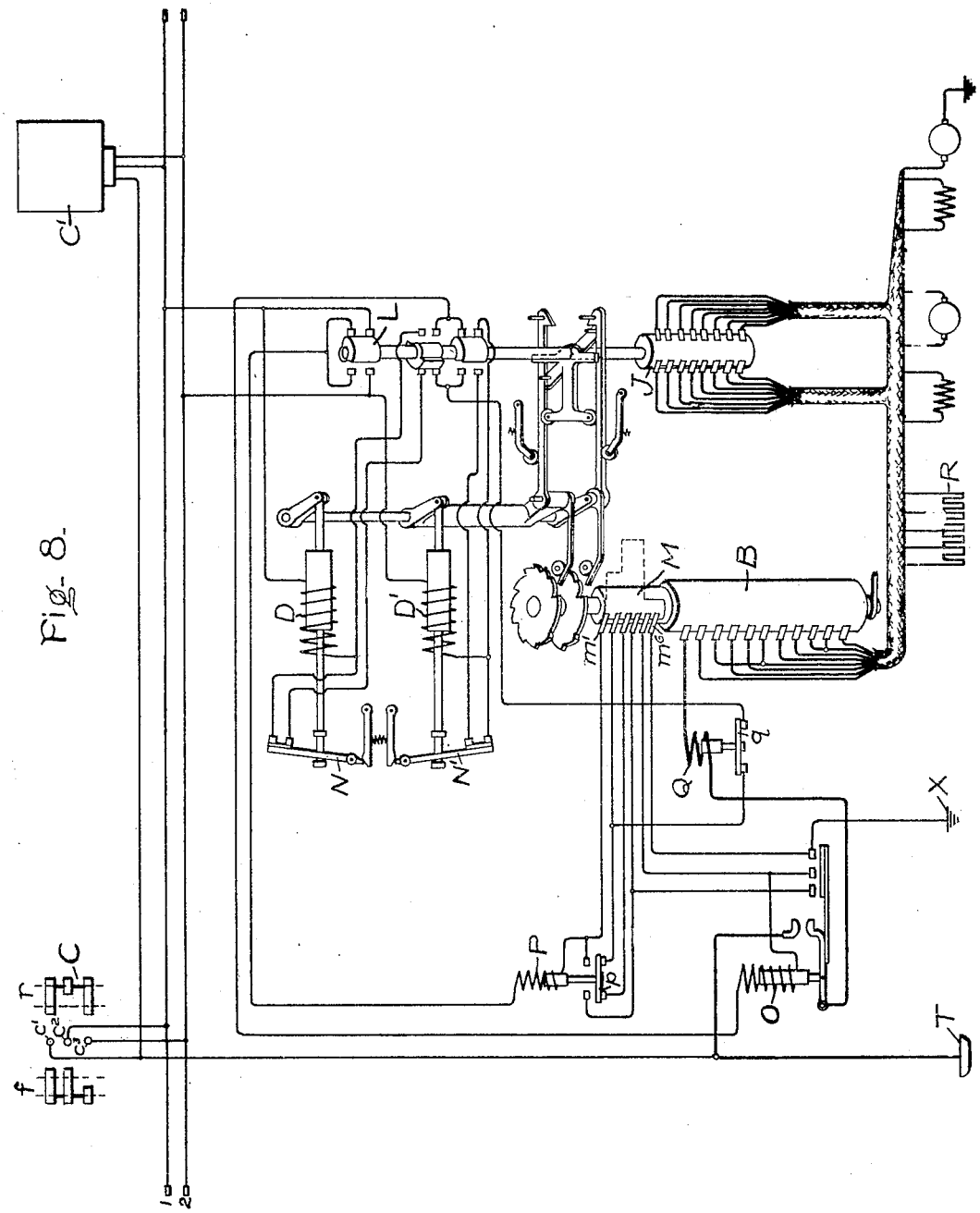

UNITED STATES PATENT OFFICE.

EUGENE R. CARICHOFF, OF EAST ORANGE, NEW JERSEY, ASSIGNOR TO GENERAL ELECTRIC COMPANY, A CORPORATION OF NEW YORK.

MOTOR-CONTROL SYSTEM.

No. 806,635.   Specification of Letters Patent.   Patented Dec. 5, 1905.

Application filed August 4, 1904. Serial No. 219,550.

*To all whom it may concern:*

Be it known that I, EUGENE R. CARICHOFF, a citizen of the United States, residing at East Orange, county of Essex, State of New Jersey, have invented certain new and useful Improvements in Motor-Control Systems, of which the following is a specification.

My invention relates to the control of electrically-propelled vehicles; and its object is to provide a novel and improved system whereby a train of motor-operated vehicles may be controlled from a single point.

My invention in its broadest aspect consists in the combination, with the motors and controlling-switches therefor on the separate cars, of novel and improved means controllable from a single distant point for operating the controlling-switches on the several cars in such manner that a gradual acceleration of the motors may be obtained at such a rate that too great a flow of current, due to too rapid an acceleration, may be avoided.

One feature of my invention consists in so arranging the distant controlling means that they may be applied directly to standard motor-controlling switches of the type now in use with practically no change in the structure, arrangement, or connections of the switches.

A second feature of my invention consists in so arranging the automatic controlling means that a small number of train-wires is required, it being possible by means of my invention to control a train of cars with a single pair of train-wires.

More specifically considered, one feature of my invention consists in the employment of two magnets operatively connected to the reversing-switch and controlling-switch on a car and so arranged that the reversing-switch is moved into one position or the other, according as one or the other magnet is first energized. The energizing of one magnet renders the other magnet inoperative as far as the reversing-switch is concerned, so that the second magnet may be utilized to move the controlling-switch step by step without interfering with the reversing-switch.

Another feature of my invention consists in the combination, with a controlling-switch arranged to be returned to off position by a spring, of the two magnet-windings above mentioned, the connections between the magnet-windings and the controlling-switch being so arranged that while one magnet-winding and its connections are being utilized for moving the controller step by step the other magnet-winding and its connections serves to maintain the controlling-switch against the tension of the spring in each position to which it is moved.

Other features of my invention will appear from the following specification and will be more specifically pointed out in the appended claims.

My invention will best be understood by reference to the accompanying drawings, in which—

Figure 2:
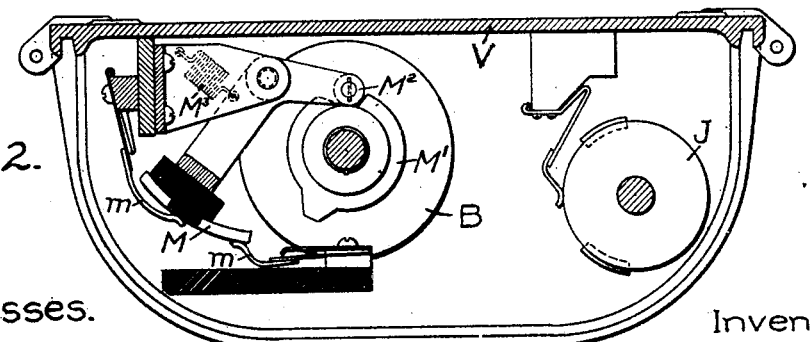
Figure 3:
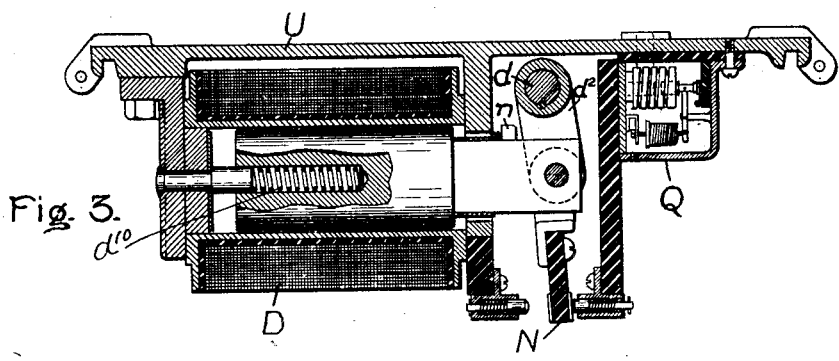
Figure 4:
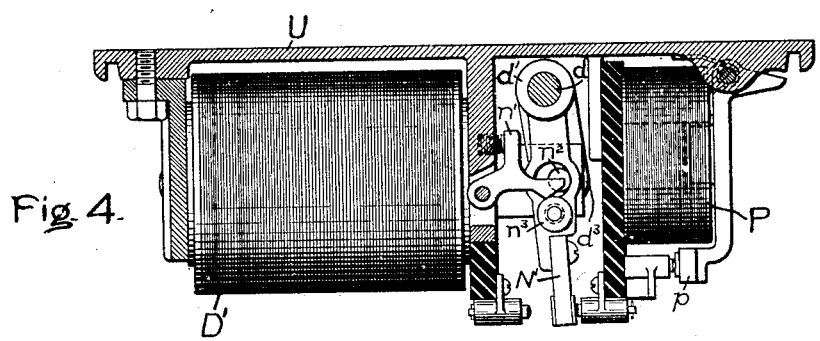
Figure 5:
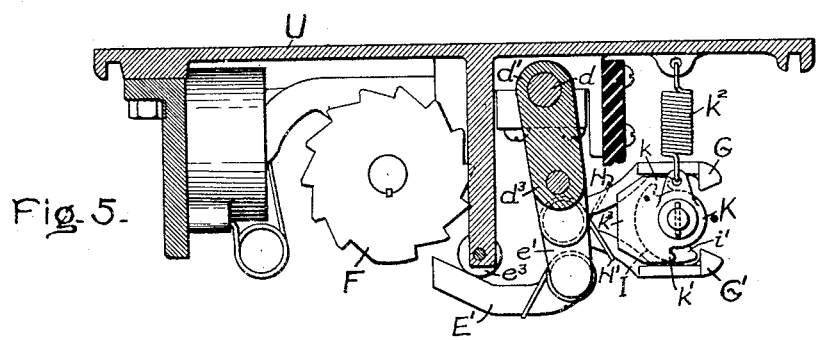
Figure 6:
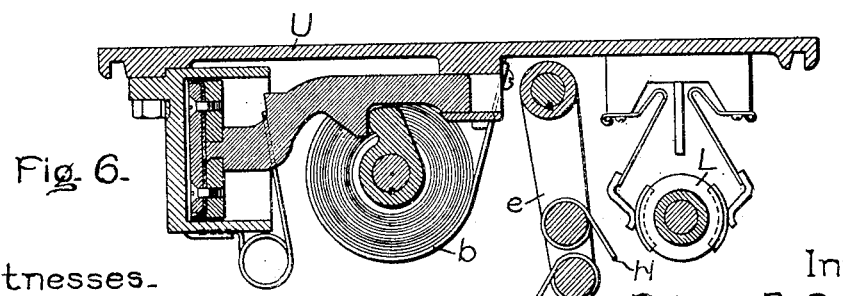
Figure 7:
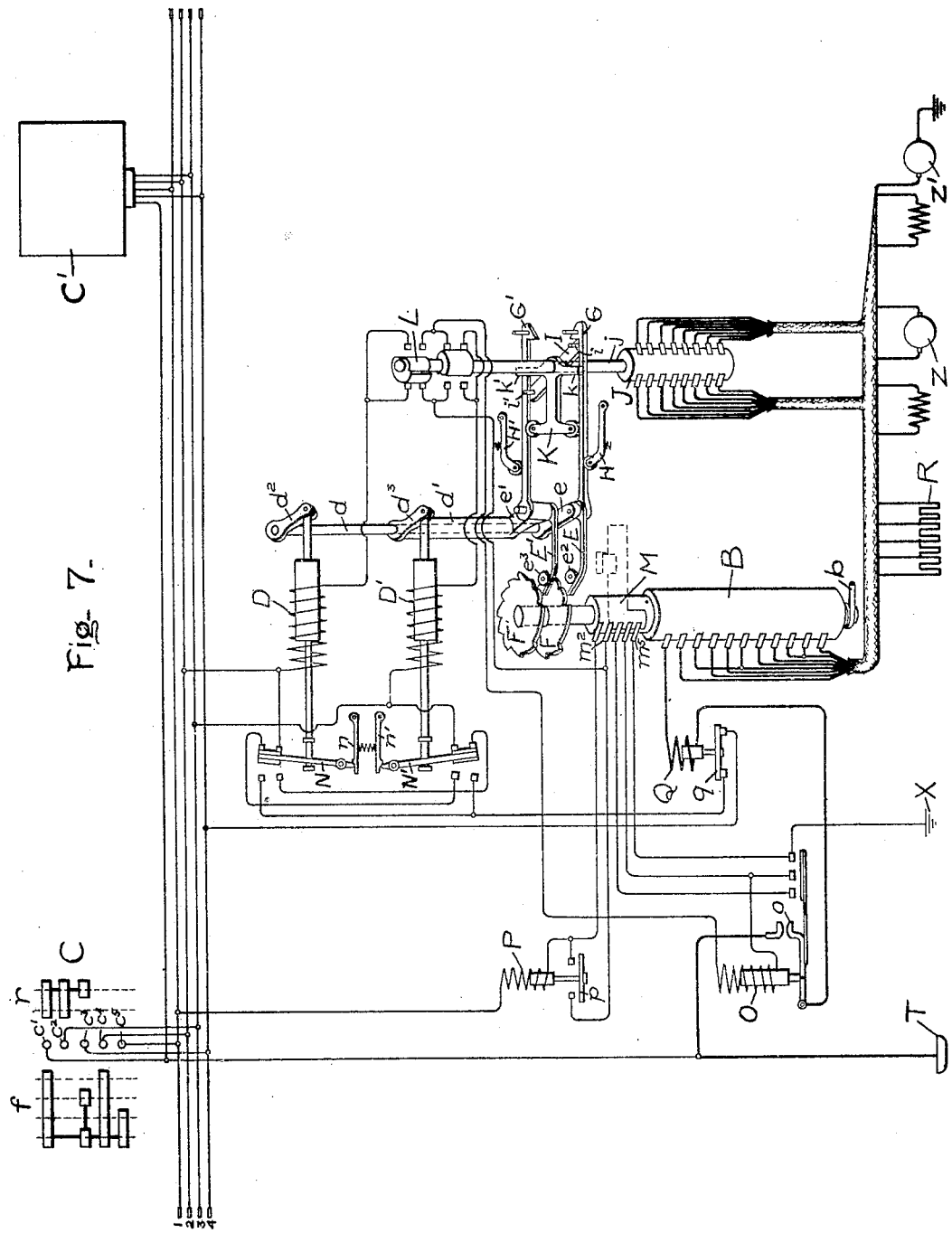

Figure 1 shows in elevation the distant controlling means adapted for use in my system and arranged to be applied to a standard motor-controller and reversing-switch. Fig. 2 shows a plan view in cross-section on the line 2 2 of Fig. 1. Fig. 3 shows a similar view on line 3 3. Fig. 4 shows a similar view on the line 4 4. Fig. 5 shows a similar view on the line 5 5. Fig. 6 shows a similar view on the line 6 6. Fig. 7 shows diagrammatically a train-control system arranged in accordance with my invention, the automatic controlling-switches being adapted for use with four train-wires; and Fig. 8 shows a modification of the same, in which the automatic controlling-switches are adapted for use in a train-control system employing only two train-wires.

In Fig. 7 I have shown an equipment for a single car of a train, and it will be understood that the equipment of the other cars are duplications of the arrangement shown. Thus 1 2 3 4, which represent the train-wires, are provided at each end with couplings, as indicated, for connection to the other cars of the train. C and C′ represent master-controllers, one of which, C, is shown with its contacts developed on a plane surface. The master-controller C has four forward positions, as indicated by the dotted lines *f*, and two reverse positions, (indicated by the dotted lines *r*.) B represents diagrammatically a speed-controller for the motors Z Z′, which may be of the usual type adapted to connect the motors in series and in parallel and to vary the amount of resistance R in the motor-circuit. J represents the usual reversing-switch for the motors. D and D′ represent the main actuating-magnets. These magnets are so arranged, as will be hereinafter described, that if magnet D is energized first the reversing-switch will be moved to its forward position and the controller B moved to its first closed position. On the other hand, if magnet-winding D' is first energized the reversing-switch J will be moved to its reverse position, while the controller B will be moved to its first closed position in the same way as if the magnet-winding D were energized. When either of the magnet-windings has been energized, the other magnet-winding is rendered inoperative as regards the reversing-switch and may be utilized by making and breaking its circuit to move the controller B through its other operative positions. The core of magnet-winding D is connected to a switch member N through a lost-motion connection. Switch member N, which is pivoted as shown, is engaged at one end by the spring-pressed lever $n$. This arrangement serves, as will be readily understood, to give switch member N a snap movement in passing from one set of contacts to the other when magnet D draws up or releases its core. The actual construction of switch member N and the lost-motion connection will be more fully described hereinafter. The core of magnet-winding D' is similarly connected to a switch member N'. The connections between the magnets D D' and the motor-controlling and reversing switches are as follows: The core of magnet-winding D engages a lever $d^2$, mounted on the shaft $d$, which carries at its farther end a second lever $e$, which carries a pivoted pawl E, which when magnet-winding D is energized so as to draw in its core engages a ratchet-wheel F on the shaft of controller B, so as to move it forward one notch. When the core of magnet-winding D is in the position shown, pawl E is held out of engagement with ratchet F by the roller $e^2$. The core of magnet-winding D' is connected to the lever $d^3$, which is mounted in the sleeve $d'$, loosely journaled on the shaft $d$. The sleeve $d'$ carries a lever $e'$, which carries the pawl E'. This pawl is adapted to engage the ratchet F on the controller-shaft when magnet-winding D' is energized. The controller B is normally held in the position shown by the spring $b$. With this arrangement it will be seen that either magnet-winding D or D' may be used by making and breaking its circuit to notch up the controller B step by step, while the other magnet-winding if energized will hold the controller in each position to which it is moved against the tension of spring $b$. The connection between the magnet-coils D D' and the reversing-switch is as follows: The arm $e$, which is connected to the core of magnet-coil D, carries the pivoted arm G, which is normally held in the position shown by the spring-pressed lever H. The lever G is formed with a hook at its end adapted to engage the pin $i$, carried by the member I and mounted on the shaft of the reversing-switch J. Similarly the arm $e'$, which is connected to the core of the magnet-winding D', carries the lever G', which is adapted to engage a pin $i'$ on the same member I. By this arrangement the reversing-switch J may be moved to one position or the other by energizing one or other of the magnet-windings D D', as has been said before. The movement of the reversing-switch into one position by energizing proper magnet-winding renders the other magnet-winding inoperative as regards the reversing-switch. The means for accomplishing this end is as follows: If magnet-winding D is energized, for instance, as to rotate the shaft $d$ and to draw the lever G into engagement with a pin $i$, the reversing-switch J will first be moved. As the movement of the reversing-switch continues, however, a pin carried by the end of the lever G engages an arm or extension $k$ on the member K, which is loosely mounted on the shaft $j$ of the reversing-switch and which is normally held in the position shown by the inner edges of the levers G and G'. When the pin carried by lever G engages the extension $k$, member K is rotated, thereby pushing lever G' outwardly against the pressure of its spring-pressed lever H'. As long as the magnet-winding D remains energized the lever G' will be held outward and away from the member I, so that if magnet-winding D' is subsequently energized the resultant movement of lever G' will not cause it to engage the pin $i''$. In other words, the magnet-winding D' is rendered inoperative as regards reversing-switch J and continues inoperative until magnet-winding D is deënergized. When both magnet-windings are deënergized, member K is returned to the position shown in the drawings by the spring-pressed members H and H'. The shaft $j$ of the reversing-switch also carries the switch L, which forms an interlock between the reversing-switch and the other switches and will be more fully described hereinafter. For the present it is sufficient to understand that the function of switch L is to prevent the closing of the motor-circuit until switch J is moved to its proper position. As has been said heretofore, switch J is supposed to be in the reverse position. If the magnet-winding D is energized to move switch J to forward position, the motor-circuit cannot be closed until the reversing-switch J has been moved to its proper position. In addition to the controlling-switch B and the reversing-switch J there is a third switch in the motor-circuits—namely, the contactor $o$, controlled by the magnet-winding O. It is necessary that all three switches $o$, B, and J should be closed in order to close the motor-circuit. The coil O, which controls the switch $o$, is controlled by the switch L, and it is by means of this coil that the interlock between the reversing-switch and the other switches of the motor-circuit is obtained, as will be hereinafter described. Q is an overload circuit-breaker or throttle, the actuating-coil of which is connected to the motor-circuit while the switch operated by the coil is in the control-circuit. P represents a coil by means of which the power-circuit connections are established for moving controller B to connect the motors in parallel. M represents a contact carried by the controller B and engaged by a plurality of brushes $m$. The shape of contact M is shown by the dotted development. The function and arrangement of these brushes will hereinafter appear.

The operation of the system thus far described is as follows: The various parts being in the off position, as shown, suppose the master-controller C to be moved to its first forward position, as indicated by the first dotted line $f$. A circuit is then closed, as follows: from the trolley or collector-shoe T to contact $c'$ of master-controller C, to contact $c^4$, to train-wire 2, to magnet-winding D, switch L, brush $m^2$, to contact M on controller B, brush $m^5$, to earth X. Magnet-winding D is consequently energized and draws up its core, shifting switch N and rotating shaft $d$, as has been heretofore explained. This results in advancing controller B only enough to bring it to its first operative position and also results in shifting member I, so as to move the reversing-switch J to its forward position, and also rotating member K, so as to move lever $G'$ away from member I. The movable contacts of switch L are so arranged that one set of stationary contacts is engaged before the circuit is broken at the other set, so that the circuit of magnet-winding D is maintained closed while reversing-switch J is being moved. When the upper movable contact of switch L is moved to engage the other pair of stationary contacts, it will be seen that the circuit passing through magnet-winding D is transferred so as to include coil O before passing to the contact M and earth X. Contactor $o$ is consequently closed, thereby closing the motor-circuit and also closing a maintaining-circuit from the lower terminal of magnet-winding O directly to earth X. Thus it is seen that switch L must be rotated a given distance before the motor-circuit can be closed. In other words, the reversing-switch must have reached its proper position before the motor-circuit is closed. In the first operative position of controller B the motors are connected for their lowest speed, as in series with the resistance R all in circuit. This condition of the motor-circuit continues as long as master-controller C is maintained in its first forward position. When the master-controller is moved to its second forward position, another circuit is closed, as follows: from trolley T to contact $c'$, to contact $c^5$, train-wire 4, bridging member $q$ of throttle Q, switch N, switch N', magnet-winding D', switch L, brush $m^2$, contact M, brush $m^5$, to earth X. Magnet-winding D' is thus energized and rotates sleeve $d'$, moving pawl E' in engagement with ratchet F' and moving controller B one more step. This movement has no effect upon reversing-switch J, as lever $G'$ is held away from member I by member K, as has been heretofore explained. The movement of the core of magnet-winding D', however, results in moving switch member N' to its other position, thereby breaking the circuit of magnet-winding D'. The core of magnet-winding D' consequently returns to its original position by gravity or by a spring similar to the spring $d^{10}$, associated with the core of electromagnet D, returning pawl E' to the position shown in the drawings. The pawl E, however, maintains controller B in the position to which it has been moved against the tension of spring $b$. As soon as the core of magnet-winding D' has returned to its original position the circuit of magnet-winding is again closed by the switch member N', and the circuit of magnet-winding D' in this manner is made and broken a number of times, thereby notching the controller B step by step to its several positions. If at any time too rapid an acceleration of the motor is produced, so as to overload the motor-circuit, throttle Q acts to break the circuit of magnet-winding D' and holds it open until the current in the motor-circuit has fallen to the proper amount. The movement of controller B is continued until the brush $m^2$ leaves the contact M, which is shaped as shown in the dotted development. This acts to break one of the connections between switch L and earth, and thereby opens the circuit-magnet winding D'. Further movement of controller B is thus prevented. This position of controller B may correspond to full series position, with resistance R entirely cut out of the motor-circuit. This condition of the motor-circuit continues as long as master-controller C is maintained in its second position. When the controller is moved to its third position, another circuit is closed, as follows: from trolley T to contact $c'$, to contact $c^5$, train-wire 1, magnet-coil P, brush $m'$, contact M, brush $m^5$, to earth. Magnet-coil P consequently draws up its core, closing its bridging member $p$, thereby connecting switch L to earth through bridging member $p$, brush $m'$, contact M, and brush $m^5$. Magnet-winding D' does not resume the notching-up process, since its circuit has been broken at another place—that is, at contact $c^3$ of the master-controller. When, however, master-controller is moved to its fourth position, the circuit of winding D' is again closed and the notching-up process resumed, moving controller B through its remaining position and continuing the movement until movable contact M leaves the brushes. The controller then stops automatically in full-speed position and is maintained there as long as the master-controller C is held in its fourth forward position. When the master-controller C is moved to off position, the circuit of magnet-winding D is broken, ratchet F is released from pawl E, and controller B is returned to its off position by spring $l$. If at any time during the notching-up process it is desired to hold controller B stationary, it may be done by moving master-controller C from its fourth position to its third or from its second to its first, as the case may be.

Referring now to Fig. 8, it will be seen that the automatic controller-switches may be so arranged that only two train-wires are required. The general arrangement is similar to that of Fig. 7, but has in addition a third movable contact and two more pairs of stationary contacts for switch L, an additional brush $m^6$, a change in the shape of the contact M, and two additional stationary contacts for the bridging member $p$. On the other hand, one pair of stationary contacts is omitted for switch N and for switch N', and the master-controller C is simplified in its construction. The operation of this modified system is as follows: When controller C is moved into its first forward position, a circuit is closed from trolley T to contact $c'$, contact $c^2$, train-wire 1, switch L, magnet-winding D, switch N, switch L, contacts of throttle Q, brush $m^2$, brush $m^6$ to earth X. Magnet-winding D is thus energized, moving the reversing-switch to its forward position and moving controller B one step. As in the former arrangement the circuit of magnet-coil O is not closed until this movement of switch J has been accomplished, the closing of the circuit-coil O being accomplished by the middle movable contact-switch L. This contact of switch L also acts to maintain circuit of winding D closed, for this circuit would otherwise be opened when the core reaches the limit of its travel by the opening of switch N. Controller B remains in its first position, in which the motors are connected in series, with all of resistance R in circuit as long as master-controller C is maintained in its first forward position. When it is moved to its second forward position, another circuit is closed from trolley T to contact $c'$, contact $c^3$, train-wire 2, magnet-winding D', switch N', lowest movable contact of switch L, contact of throttle Q, brush $m^2$, contact M, brush $m^6$ to earth. Magnet-winding D' is thus energized and begins its notching-up process, switch N' opening and closing its circuit as its core is moved back and forth, and this notching up continuing until brushes $m'$ and $m^2$ leave contact M. The circuit of magnet-winding D' is opened at this point by the brush $m^2$ and further notching-up is prevented. Coil P is also energized when controller C is in its second position and draws up its core, closing a maintaining-circuit for itself. This position corresponds to full series position. In order to continue the notching-up process, it is necessary to move master-controller C back to position 1 and then restore it to position 2. The effect of this is first to deënergize coil P, so as to allow its armature to fall. This closes a circuit from magnet-winding D', switch N', switch L, bridging member $q$, bridging member $p$, brush $m^3$, and brush $m^6$ to earth. Consequently when the master-controller is returned to its second forward position, thereby connecting the other terminal of winding D', through train-wire 2, to trolley T, the notching-up process is resumed and continues until contact M leaves the brushes $m^3$ and $m^4$.

I will now describe the construction of a set of automatic switches arranged in accordance with the foregoing description and adapted for use with the controller and reversing-switch of a street-car equipment of the present date. The advantage of this arrangement consists in the facility with which a number of cars equipped for ordinary operation may be adapted for operation in a train controlled by the multiple-unit system.

In Figs. 1 to 6 the several parts are lettered to correspond with the figures which have heretofore been explained. Thus the magnet-winding D has its core connected to a lever $d^2$, secured to the shaft $d$. The core of coil D also operates the switch member N, as is clearly shown in Fig. 3. The shaft $d$ carries at its other end the lever $e$, as shown in Fig. 6, this lever carrying the pivoted spring-pressed pawl E and the pivoted spring-pressed lever G. The core of coil D' engages a lever $d^3$ on the sleeve $d'$. This is clearly shown in Fig. 4. Fig. 4 also clearly shows the lost-motion connection between the core of magnet-winding D' and switch member N'. The core carries a pin $n^2$, which engages a hole in the lever N'. This lever carries a knob or roller $n^3$, engaged by the spring-pressed member $n'$, which acts to give the member N' a snap movement in the same manner as was indicated diagrammatically in Figs. 7 and 8. The sleeve $d'$ carries the lever $e'$, which in turn carries the spring-pressed pawl E' and the spring-pressed lever G'. This is clearly shown in Fig. 5. The pawls E and E' are adapted to engage a ratchet-wheel F on the shaft of controller B when the magnet-windings D and D' are energized. When the magnet-windings are deënergized, the pawls E and E' are held out of engagement with the ratchet by the rollers $e^2$ and $e^3$, respectively. The levers $e$ and $e'$ carry, respectively, the levers G and G', which are pressed toward each other by the springs H and H'. These springs take the place of the spring-pressed members H and H', as shown in the diagram. The levers G and G' are formed with hooks at the ends in the manner heretofore described and when retracted by the rotation of shaft $d$ or sleeve $d'$ engage the members I and K, which are clearly shown in Fig. 5. The member I is secured to the shaft of the reversing-switch J, and by means of it the switch member J is moved from one position to the other. The member K, which is loosely mounted on the shaft and is normally held in a central position by a spring $k^2$, has a projecting cam-like portion $k^3$, which when member K is rotated engages the lever G or G', pushing it outwardly, so as to prevent it from engaging the member I. The switch L (shown in Figs. 6 and 1) acts as a coupling to lengthen the shaft of the reversing-switch by holding secured thereto the extension $j$. The controller is returned to its off position by means of a spring $b$, which is shown in Figs. 1 and 6. The contact M, instead of being directly carried by the motor-controller, I have shown in Figs. 1 and 2 operated by the cam M', carried by the shaft of controller B. The contact M is pivoted and carries the roller $M^2$, engaging the cam M', so that as controller B is rotated the desired movement of the contact M is obtained. Spring $M^3$ holds the roller $M^2$ in engagement with the cam.

The construction of coil P, which controls the series-parallel relation of the motors, is shown in Figs. 1 and 4, this construction being shown with especial clearness in the latter figure. The overload relay or throttle is represented at Q.

All of the automatic switch devices are supported as shown on the back of the casing U, which is shaped similarly to an ordinary controller-casing, so that it may be placed on top of the ordinary casing V. Consequently all that this requires in order to adapt a standard street-car equipment for use in a train-control system in accordance with my invention is to remove the cover on the controller, to place the case U above the case V, to secure the ratchet F, cam M', and the spring $b$ to the controller-shaft, and to secure the switch L and the members I and K to the shaft of the reversing-switch. All the controller-switches are thus contained in the single casing, with the exception of the master-controller and the contactor O, which may be placed in any suitable location.

While I have described a complete controller system and have shown a desirable mechanical construction for the several automatic switches, it will be understood that the several features of my invention, while I prefer to use them together, may with advantage be used separately, and I desire to claim them whether used together or not. Accordingly I do not desire to limit myself to the particular construction shown; but I aim in the appended claims to cover all such modifications which are within the scope of my invention.

What I claim as new, and desire to secure by Letters Patent of the United States, is—

1. In combination, a reversing-switch, two devices controllable from a distance, operative connections between said devices and said switch whereby said switch may be moved to its two operative positions by said devices respectively, and means for breaking the operative connections between one of said devices and said switch when the other of said devices is energized.

2. In a motor-control system, a reversing-switch, a controlling-switch, two devices controllable from a distance and arranged when energized respectively to move said reversing-switch to its two operative positions, means for rendering one of said devices inoperative with respect to said reversing-switch when the other device is energized, and operative connections between both devices and said controlling-switch, whereby said controlling-switch is moved through its operative positions by the repeated energizing and deënergizing of either device.

3. In a motor-control system, a reversing-switch, a controlling-switch, two devices controllable from a distance and arranged when energized respectively to move said reversing-switch to its two operative positions, means for rendering one of said devices inoperative with respect to said reversing-switch when the other device is energized, operative connections between both devices and said controlling-switch whereby said controlling-switch is moved through its operative positions by the repeated energizing and deënergizing of either device, and means at a distant point for energizing either of said devices and maintaining it energized and for repeatedly energizing and deënergizing the other device.

4. In a motor-control system, a reversing-switch, a controlling-switch, two devices controllable from a distance and operatively connected to both switches, and means for rendering one of said devices inoperative with respect to said reversing-switch when the other device is energized.

5. In a motor-control system, a reversing-switch, a controlling-switch, two devices controllable from a distance and operatively connected to both switches, means for rendering one of said devices inoperative with respect to said reversing-switch when the other device is energized, and means at a distant point for energizing either of said devices and maintaining it energized and for repeatedly energizing and deënergizing the other device, the connections between said devices and said controlling-switch being adapted and arranged to produce a step-by-step movement of said switch through its several positions upon the repeated energizing and deënergizing of either of said devices.

6. In a motor-control system, a reversing-switch, a controlling-switch, two electromagnets operatively connected to both switches, means for breaking the operative connection between one of said magnets and the reversing-switch when the other magnet is energized, and a switch at a distant point arranged to close selectively the circuit of either magnet and then to close the circuit of the other.

7. In a motor-control system, a reversing-switch, a controlling-switch, two electromagnets operatively connected to both switches, means for breaking the operative connection between one of said magnets and the reversing-switch when the other magnet is energized, and means for closing the circuit of either magnet and maintaining it closed and for repeatedly making and breaking the circuit of the other magnet, the connections between said magnets and said controlling-switch being arranged to produce a step-by-step movement of said reversing-switch through its several operative positions upon the repeated energizing and deënergizing of either of said magnets.

8. In a motor-control system, two electromagnets, a controlling-switch, operative connections between said magnets and said switch whereby said switch is moved through its operative positions upon the repeated energizing and deënergizing of either of said magnets, a reversing-switch, operative connections between said magnets and said reversing-switch whereby said switch is moved to either of its operative positions upon the selective energizing of said magnets, means for rendering the other magnet inoperative with respect to said reversing-switch when one magnet is energized, switch-contacts controlled by said magnets and arranged to open when said magnets are energized, and a switch at a distant point arranged to close selectively the circuit of either magnet independently of said switch-contacts and then to close the circuit of the other magnet with said contacts in series therewith.

9. In a motor-control system, a reversing-switch, a controlling-switch, two electromagnets operatively connected to both switches, means for breaking the operative connection between one magnet and said reversing-switch when the other magnet is energized, switch-contacts controlled by said magnets and arranged to open when said magnets are energized, and a switch at a distant point arranged to close the circuit of one magnet independently of said switch-contacts and then to close the circuit of the other magnet with said contacts in series therewith.

10. In a motor-control system, a controlling-switch, a spring adapted to hold said switch normally in off position, a ratchet-wheel carried by said controller, two electromagnets, two pawls operatively connected to said two magnets respectively and adapted to engage said ratchet-wheel when said magnets are energized, switch-contacts operatively connected to said magnets and arranged to open when said magnets are energized, and a switch at a distant point arranged to close the circuit of one magnet independently of said contacts and then to close the circuit of the other magnet with said contacts in series therewith.

11. In a motor-control system, a controlling-switch, a spring adapted to hold said switch normally in off position, a ratchet-wheel carried by said controller, two electromagnets, two pawls operatively connected to said two magnets respectively and adapted to engage said ratchet-wheel when said magnets are energized, a reversing-switch, operative connections between both magnets and said reversing-switch, means for breaking the operative connections between one of said magnets and said reversing-switch when the other magnet is energized, and means for selectively energizing either of said magnets and maintaining it energized and for repeatedly energizing and deënergizing the other magnet.

12. In a motor-control system, a controlling-switch, a spring adapted to hold said switch normally in off position, a ratchet-wheel carried by said controller, two electromagnets, two pawls operatively connected to said two magnets respectively and adapted to engage said ratchet-wheel when said magnets are energized, a reversing-switch, operative connections between both magnets and said reversing-switch, means for breaking the operative connections between one of said magnets and said reversing-switch when the other magnet is energized, switch-contacts operatively connected to said magnets and arranged to open when said magnets are energized, and a switch at a distant point arranged to close the circuit of one magnet independently of said contacts and then to close the circuit of the other magnet with said contacts in series therewith.

13. In combination with a motor-controller having a plurality of operative positions, an actuating-electromagnet therefor, connections between said magnet and said controller adapted to produce a step-by-step movement of said controller upon the repeated energizing and deënergizing of said magnet, switch-contacts controlled by said magnet and in circuit therewith and arranged to open when said magnet is energized, switch-contacts controlled by said controller and arranged to open the circuit of the actuating-magnet at predetermined positions of the controller, an electromagnetic device for reëstablishing said circuit, and a switch at a distant point controlling the circuits of said actuating-magnet and said device.

14. In combination with a motor-controller having a plurality of operative positions, means controllable from a distance for moving said controller step by step through said positions, means controlled by the controller for stopping the operation of said moving means at predetermined positions of said controller, a device for setting said moving means again in operation, and means at a distant point for controlling said moving means and said device.

15. In combination with a motor-controller having a plurality of operative positions, an electromagnet operatively connected thereto and adapted when energized to move said controller step by step through said positions, a movable switch member in circuit with said electromagnet, and a cam carried by said controller and controlling the position of said switch member.

16. In combination with a motor-controller having a plurality of operative positions, an electromagnet operatively connected thereto and adapted when energized to move said controller step by step through said positions, a cam carried by said controller, a pivoted switch member in circuit with said electromagnet, and means for holding said member in engagement with said cam.

17. In combination, a casing, a controlling-switch and a reversing-switch journaled therein, two electromagnets mounted on an extension of said casing, and operative connections between both magnets and both switches.

18. In combination, a casing, a controlling-switch and a reversing-switch journaled therein, a ratchet-wheel secured to the shaft of said controller, a member secured to said reversing-switch, two electromagnets mounted on an extension of said casing, two pawls actuated by said magnets respectively and adapted to engage said ratchet, and two members actuated by said magnets respectively and adapted to engage the member secured to the reversing-switch.

19. In combination, a casing, a controlling-switch and a reversing-switch journaled therein, a ratchet-wheel secured to the shaft of said controller, two members on the shaft of said reversing-switch, one secured thereto and the other loose thereon, two electromagnets mounted on an extension of said casing, two pawls actuated by said magnets respectively and adapted to engage said ratchet, and two levers actuated by said two magnets respectively and each adapted to engage both members on the shaft of the reversing-switch, the loose member being adapted when engaged by one lever to prevent the engagement of the other member by the other lever.

20. In combination, a reversing-switch, two members on the shaft thereof, one fast and one loose thereon, and two separately-actuated devices each adapted to engage both said members, the loose member being adapted when engaged by one device to prevent the engagement of the other member by the other device.

21. In a system of motor control, a reversing-switch, two members on the shaft thereof, one fast and one loose thereon, two electromagnets, and two devices operatively connected to said two magnets respectively and each adapted to engage both of said members, the loose member being adapted when engaged by one device to obstruct the engagement of the other member by the other device.

In witness whereof I have hereunto set my hand this 2d day of August, 1904.

EUGENE R. CARICHOFF.

Witnesses:
CHESTER D. REED,
LEO C. FOSS.